United States Patent

[11] 3,615,468

[72] Inventor Lauri D. Tiala
Towanda, Pa.
[21] Appl. No. 773,972
[22] Filed Nov. 6, 1968
[45] Patented Oct. 26, 1971
[73] Assignee Sylvania Electric Products Inc.

[54] PHOTOPRINTING PROCESS AND ARTICLE
4 Claims, No Drawings

[52] U.S. Cl. 96/36.3, 96/35.1, 96/36.1, 96/44, 96/79, 96/88
[51] Int. Cl. G03f 7/00
[50] Field of Search 96/79, 36.1, 36.3, 44, 67, 27 R; 117/76 F, 83, 45

[56] References Cited

UNITED STATES PATENTS

| | | | |
|---|---|---|---|
| 2,999,016 | 9/1961 | Beeber et al. | 96/75 |
| 3,022,169 | 2/1962 | Heckelmann et al. | 96/67 |
| 3,376,138 | 4/1968 | Giangualano et al. | 96/36.3 X |
| 3,443,946 | 5/1969 | Grabhofer et al. | 96/67 X |

*Primary Examiner*—William D. Martin
*Assistant Examiner*—Ralph Husack
*Attorneys*—Norman J. O'Malley, Donald R. Castle and Cyril A. Krenzer

ABSTRACT: A photographic master is disclosed wherein the master comprises a base, a pattern, a protective coating and a plurality of protrusions that provide a gas escapement means when the master is used to provide a pattern upon a metallic sheet in a contact printing process. An improved process and a new composition for providing the protective coating and the protrusions are also disclosed.

PHOTOPRINTING PROCESS AND ARTICLE

BACKGROUND OF THE INVENTION

This invention relates to the manufacture of precision articles from thin metallic sheets using photographic and etching techniques. More particularly it relates to improvements relating to the photoprinting step of the photoetching process and to new masters used in the process.

In general, the process includes the steps of cleaning the metallic sheet, coating the sheet with a light-sensitive or photoresist material, photoprinting a desired pattern onto the coated surfaces by subjecting them to light through a photographic master, removing an exposed or unexposed portion of the photoresist and etching away the portions not covered by the resist. In most instances during the photoprinting step, the surface of the metallic sheet is coated with the light-sensitive resist material and is then moved to a station containing the master and stopped when in the desired position. Close contact between the master and the coated metallic sheet is achieved by applying a vacuum. Close contact between the metallic sheet and the master insures that precisely defined patterns are projected on the sensitized material. The metallic sheet is then exposed to actinic light for a predetermined period of time while the masters are held in close contact with the sheet. After a suitable exposure time, the frame is separated and the metallic sheet is transferred to the etching and finishing steps.

The photographic masters generally have a photographic emulsion in the form of the desired pattern over a transparent base to achieve a suitable degree of rigidity.

The master, either in the form of a negative or a positive, intermittently contacts the coated sheet. It is also essential that the master make essentially flat contact with the metallic sheet to obtain uniform exposure. The vacuum is applied to remove any air pockets that are present between the master and the metallic sheet. In order to prevent excessive wear or damage to the emulsion on the master during the photoprinting step, a protective coating can be applied to the emulsion surface.

As can be appreciated, the printing step is intermittent in nature The other steps of cleaning, etching, resist application and removal can be continuous. The printing step, therefore, is often a bottleneck in the process. It is believed, therefore, that it would be an advancement in the art to provide a method and a photographic master that enables a substantial reduction in the time required for the printing step.

SUMMARY OF THE INVENTION

In accordance with one aspect of the invention, there is provided a new master in the photoetching process. The master comprises a base of a transparent sheet having at least one essentially planar surface that describes a first plane, a photographic emulsion in the form of a pattern, the emulsion having an inner surface adhered to a portion of the planar surface of the base and having an external surface that describes a second plane that is substantially parallel and external to the first plane, a protective coating over said emulsion and a plurality of protrusions extending externally to a portion of said planar surface of said base, said protrusions having external surfaces that describe a third plane that is external and substantially parallel to the first and second planes, whereby when the third plane is in essentially flat contact with the essentially planar surface of the metallic sheet to be etched, a gas escapement means is formed between said master and said second planar surface. In other aspects of this invention particular materials for forming the protrusions are disclosed. Additional aspects of this invention provide an improvement to the photoetching process and a new composition for producing the protrusions.

For a better understanding of the present invention, together with other and further objects, advantages and capabilities thereof, reference is made to the following disclosure and appended claims in connection with the above description of the invention.

DESCRIPTION OF THE PREFERRED EMBODIMENTS

The masters can be either negatives or positives and have heretofore been protected by applying a coating such as a relatively thin coating of photoresist material to the emulsion surface and then drying the coating.

As previously mentioned, the master must be in essentially flat contact with the metallic sheet in order to achieve uniformity in the products produced. To achieve this contact, a vacuum is generally applied to the printing frame to remove essentially all of the air that is between the master and the metallic sheet. Since the degree of contact is generally directly related to the vacuum that is produced in the printing frame, suitable contact can be calculated on the basis of the vacuum that is developed. It has been discovered that a master having protrusions that are external to the emulsion and the base form a gas escapement means when the protrusions contact the metallic sheet. The gas escapement means allows the air that is trapped in the inner portion, between the master and the metallic sheet, to be rapidly removed and thus reduces the time required to achieve suitable contact as determined by the degree of vacuum produced. The length of the protrusions will be governed primarily by the particular application that is desired. The length that is necessary is such that the external surfaces of the protrusions that describe the beforementioned third plane are external to and substantially parallel to the plane of the metallic sheet that the master contacts. One preferred method for providing the protrusions is to suspend effective amounts, generally from about 0.2% to about 1.0% of a relatively finely divided wear-resistant solid material, in a liquid protective coating and apply the composition containing the solids to a selected area of the master. The desired protrusions are effectively produced and by use of such masters the amount of time required to achieve the desired close contact between the master and the coated metallic sheet is substantially reduced. Additionally, it has been discovered that by employing the improved process, the quality of the articles that are produced is improved.

Although solids having a substantial portion of the particles below about 3 microns, such as 1 micron, can be used in the composition to produce the protrusions, and the benefits of the present invention can be achieved, the reduction of the time required to produce a suitable vacuum is not as great as when solids having larger particles are used in the above composition. It is preferred, therefore, to incorporate solids having a particle size of at least about 3 microns into the composition. Similarly, solids having particle sizes above about 50 microns, such as 100 microns, can be used in some instances where the amount of variation in the apertures from article to article is not critical. It is preferred in most instances to use solids having the preferred 3 micron to 50 micron particle size range. The particle size distribution within the above range does not appear to be critical when the preferred amounts of solids are used in the composition. A particle size range of from about 3 microns to about 15 microns is especially preferred in most applications since employing compositions within this range have been found to reduce the time required to bring the pattern into contact with the sheet by a relatively large amount and to yield excellent uniformity between articles.

The particular size of solids that will be used will be dependent upon the article produced. In general, plates containing a protective layer in which solids having a particle size in the upper portion of the preferred range and hence longer protrusions tend to reduce the time to achieve suitable contact more than when smaller particles are used, however, the uniformity of the articles is not as great when larger particles are used as it is when the smaller particles are used. The choice of particle size will, therefore, be dependent upon the particular article that is produced. Both uniformity of the articles and the production rate can be improved substantially by the practice of this invention, particularly when the particles are within the 3 micron to 15 micron particle size range.

The amount of solid material that is suspended in the protrusion forming composition of this invention is generally from about 0.2% to about 1% by weight of the coating. Although less than about 0.2% by weight, such as 0.1% by weight can be used and the benefits of this invention can be achieved, it is preferred to use at least 0.2% by weight and preferably at least 0.4% by weight. In general, the time required to create a suitable vacuum increases as the amount of solids decreases, particularly when less than 0.4% by weight of solid materials are used. Amounts greater than 1% by weight can be used, however, as the amount is increased the improved product uniformity is not as great and the vacuum creation times are not correspondingly decreased, therefore, amounts above about 1% are not generally used and amounts below about 0.8% are preferred.

In addition to the new master of the present invention and the improved process, there is provided a new composition that provides a protective coating and the protrusions upon the master, and is particularly suited to the present process. The composition of this aspect of the invention comprises a major amount of a light sensitive, light hardenable substance and from about 0.2% to about 1% of a wear resistant solid having a particle size of from about 3 to about 50 microns, with from about 3 to about 15 microns being preferred. The light sensitive, light hardenable substances are well known in the art and are generally polymeric material that are sensitized with a light sensitive material. For example, polyvinyl alcohol sensitized with ammonium dichromate has been used as a photoresist material and is suitable in the practice of this invention.

In general, any solid material that is not soluble in the material used for the protective coating and which can be relatively uniformly suspended in the coating can be used. In order to protect the emulsion surface it is necessary that the particles of the material have a hardness greater than the particles of the material have a hardness greater than the metal that is being etched. Use of softer materials would cause the particles to wear from the constant contact, thus eliminating the improved processing. Selection of a particular material will be dependent upon the metal being etched. For most purposes the common abrasives such as silicon carbide, silica, boron carbide and aluminum oxide abrasives are satisfactory since these materials have a hardness greater than most metallic surfaces that are photoetched.

Any liquid material that will dry to form a relatively hard protective layer and is compatible with photographic emulsions can be used to suspend the particles and to provide the coating over the emulsion. It has been found that by suspending the solids in the photoresist material that is used to coat the metallic sheet and applying this mixture to the plate containing the emulsion and thereafter drying the coated area under ultraviolet light, affords a relatively easy method. Since the same material can be used to coat the plate or master and the metallic sheet, the inventory of raw materials can be reduced. Other liquid coating materials can be used if desired such as epoxy resins, silicones, thin film plastics and the like.

As previously mentioned, the photographic emulsion, containing a predetermined pattern, is prepared generally via photographic methods to a transparent base. Although any transparent material, such as various plastics, can be used, glass is generally preferred since it is dimensionally stable particularly under changing temperature and humidity conditions.

The invention as described herein can be used for producing a number of precision articles. Among the articles, the production of which is improved by the present invention, are aperture masks for television tubes, fine screens for mechanical separation of solid particles, reticles for sighting instruments, electric razor heads, lead frames for integrated circuits and other articles requiring precise location of relatively small openings in a metal sheet.

For most articles the metal sheet is less than about 0.02 inch thick and usually within the range of from about 0.001 inch to 0.010 inch thick. Metals and alloys of iron, copper, nickel and cobalt are usually used.

In most instances, when the protrusions are provided by the preferred coating method the protective coating containing the particles will be applied over the complete surface of the master. The light is apparently diffused around the particles to a sufficient degree to achieve the desired degree of exposure. If desired, however, the coating containing the particles can be applied only to the edges and outside the pattern, although the benefits achieved sometimes are not as large as when the protrusions are spaced over the entire master. All that is required to achieve at least some of the benefits from this invention is that the protrusion extend externally to a portion of the planar surface defined by the base of the master.

Although the invention has generally been described in terms of the employment of the preferred embodiment to achieve the protrusion, that is use of a coating material, the protrusion can extend from the base or can be provided by incorporation of the particles into the photographic emulsion, if desired. Other methods of providing the protrusion will be suggested to those skilled in the art from the present specification.

It is to be noted that in most instances the photographic pattern will be applied to both sides of the metal sheet. The designs are in register with one another so that etching can be accomplished on both sides of the metal sheet. Generally, the same coating will be applied to both masters when the above method is used since the photostations are essentially duplicates on each side of the sheet. When this method is used, in order to achieve maximum benefits from the present invention, the same coating will be generally provided for both masters so that the time required for the creation of the vacuum will be essentially identical.

To more fully explain the foregoing invention, the following detailed examples are presented. All parts, proportions and percentages are by weight unless otherwise indicated.

Example I a master negative for a television aperture mask is prepared by adhering a relatively thin photographic emulsion having a desired pattern to a printing plate having dimensions of 24 inches ×32 inches ×0.019 inches. The entire plate is coated with a photographic resist material and then exposed to ultraviolet light for about 1 minute to harden the protective coating.

A substantially identical master is coated with a composition prepared by suspending about 0.5 part by weight of aluminum oxide as a solid in about 65 parts by weight of a photoresist thinner, and about 34.5 parts by weight of a photoresist material. The particle size distribution of the aluminum oxide is as follows:

| Diameter Microns | % by weight smaller than indicated size |
|---|---|
| 15 | 100 |
| 14 | 99.4 |
| 13 | 99.3 |
| 12 | 99.0 |
| 11 | 97.2 |
| 10 | 94.2 |
| 9 | 88.7 |
| 8 | 80.4 |
| 7 | 71.6 |
| 6 | 57.7 |
| 5 | 41.9 |
| 4 | 26.3 |
| 3 | 12.1 |
| less than 2 | 0. |

On a production line producing television aperture masks from a metal sheet and using the master coated with the material without the aluminum oxide, the time required to achieve substantially intimate contact between the master and the metallic sheet is about 2¼ minutes.

The time required to create essentially the same contact when the master is coated with the composition containing the abrasive is only about 1 minute. A corresponding increase in production rate is thereby achieved. Additionally, on repetitive prints from the same master, the print to print variation of the etched holes in the aperture masks is found to be about 0.00029 inch when the master without the abrasive is used and about 0.00011 inch when the master with the abrasive coating is used. A more uniform product is produced by using the coating containing the abrasive.

Substantially similar results are achieved when other abrasives, having similar particles in substantially similar amounts and sizes, are substituted for the aluminum oxide of the present invention.

While there have been shown and described what are at present considered the preferred embodiments of the invention, it will be obvious to those skilled in the art that various changes and modifications may be made therein without departing from the scope of the invention as defined by the appended claims.

I claim:

1. In a photographic master useful in photoetching process wherein the master is brought into contact with a flat metallic sheet having an essentially planar surface, wherein said master comprises:

a base of a transparent sheet having at least one essentially planar surface that describes a first plane;

a photographic emulsion in the form of a pattern, said emulsion having an inner surface adhered to a portion of said planar surface of said base and having an external surface that describes a second plane that is substantially parallel and external to said first plane; and a solid protective coating over said emulsion, the improvement comprising providing a plurality of protrusions extending externally to a portion of said planar surface of said base, said protrusions having external surfaces that describe a third plane that is external and substantially parallel to said first and second planes, said protrusions consisting of relatively finely divided, solid inorganic material having a hardness greater than said metallic sheet, whereby when said third plane is in essentially flat contact with said essentially planar surface of said flat metallic sheet, a gas escapement means is formed between said master and said flat metallic sheet.

2. A photographic master according to claim 1 wherein said solid material has a particle size of from about 3 microns to about 50 microns.

3. In a process wherein a relatively thin flat metallic sheet is coated with a light sensitive material, a design is photoprinted on the light sensitive coating by the use of a master in contact with said coated metallic sheet and contact is established by the use of vacuum printing frames and portions of the coating are rendered selectively removable by said photoprinting step and a design is thereafter etched in said sheet, and wherein a master is brought into contact with said sheet wherein said master comprises:

a base of a transparent sheet having at least one essentially planar surface that describes a first plane;

a photographic emulsion in the form of a pattern, said emulsion having an inner surface adhered to a portion of said planar surface of said base and having an external surface that describes a second plane that is substantially parallel and external to said first plane; and a solid protective coating over said emulsion, the improvement comprising reducing the time to achieve suitable contact between said master and said sheet by providing a plurality of protrusions extending externally to a portion of said planar surface of said base, said protrusions having external surfaces that describe a third plane that is external and substantially parallel to said first and second planes, said protrusions consisting of relatively finely divided, solid inorganic material having a hardness greater than said metallic sheet, whereby when said third plane is in essentially flat contact with said essentially planar surface of said flat metallic sheet, a gas escapement means is formed between said master and said flat metallic sheet for removal of air trapped between said master and said metal sheet.

4. An improvement according to claim 3 wherein the particle size of said solid material is from about 3 microns to about 50 microns.